Patented Feb. 8, 1944

2,341,242

UNITED STATES PATENT OFFICE 2,341,242

SLIP FOR ENAMELING

Jacob E. Rosenberg, Pittsburgh, Pa., assignor to The O. Hommel Company, a corporation of Pennsylvania No Drawing. Application July 24, 1941, Serial No. 403,875

8 Claims. (Cl. 106—48)

This invention relates to enamel-ware production, and consists in a preparation of clay, suitable for incorporation in the slip that is applied to the metal surface to form a ground coat. By preparing the clay in the manner to be described a difficulty is overcome and a superior product is gained.

In the enameling industry, a glass of appropriate composition and of suitable, and generally of low, melting-point is ground to powder and worked with clay and water to a slip, and in the form of slip is spread upon the surface of the article to be coated and dried and fired, to form a ground coat. Upon the ground coat, ordinarily, a cover coat in turn is spread and fired.

The industry has long used in this practice an imported clay, known as German Vallendar clay. Domestic clays have not been satisfactory, and, so long as the imported article was to be had, the inducements were not sufficient to lead to investigation of the matter of domestic clays, to discover if possible the reason why they have not been satisfactory, and to make correction.

The domestic clays have not been satisfactory because when they are used the product tends to show the defect known as fish-scaling. Minute fissures appear, giving to the fired article a disfigured appearance, and in service the enamel coating is not sufficiently adherent and durable.

I have investigated, and have discovered, first, that urea has specific value in correcting the fault. I have found that if to domestic clay urea be added in quantity of about 4% (a quarter of a pound of urea to seven pounds of clay) the clay will be equally satisfactory in service with German Vallendar clay. The fault of fish-scaling will be corrected: it will not appear. Urea may be added to the clay in larger ratio than that named, and while the excess will have no ill effect, it will not have additional value; but in appreciably smaller ratio it will be ineffective for the end in view.

A difficulty, however, that attends the use of urea is that it is itself an instable substance, and, in warm weather particularly, clay that has by the addition of urea been prepared for use shows a tendency to ferment. And my further discovery in this connection is that, by the incorporation with the urea in the clay a small quantity of material inhibitory of the growth of bacteria, the clay preparation may be rendered sufficiently permanent for all practical purposes, even in warm weather. Materials inhibitory of bacteria growth are well known, and I do not intend to limit my invention in its broader aspect to the use of any particular material. By way of examples, however, I name copper carbonate, sodium benzoate, and mercuric oxide, and, by way of example, the quantity of copper carbonate suitable to effect the end in view is substantially three ounces to one hundred pounds of mixed clay (=approximately, 0.20%).

Consideration of the successful use of urea has led me to the perception that, while in the course of the enameling operations the urea continues unaltered through the drying step that follows the spreading of the slip, in which step a peak temperature of about 300° F. is ordinarily attained, in the ensuing firing step, in which a peak temperature of 1100° F. or more is attained, the urea breaks down and is resolved into gases. I have made search for other materials that, continuing unaltered at temperatures ranging to 300° F., should within the range of enamel firing give off gas, and materials that should not in other respect be prejudicial to the product; and I have found sodium bicarbonate to be such another material. Within the temperature range indicated it gives off $CO_2$, and has like effect with urea in the prevention of fish-scaling. And it has no prejudicial effect upon the product. Calcium carbonate, on the other hand, will not do, for it will not give off gas at a sufficiently low temperature. Sodium bicarbonate possesses for my purposes this advantage, that clay compounded with it will not ferment; and it requires no accompanying preventive or corrective substance.

In addition to the specific substances named, urea and sodium bicarbonate, my invention will be realized in incorporating in the slip with the clay a substance that in the temperature interval between the drying temperature of substantially 300° F. and the firing temperature of substantially 1100° F. and upward, gives off gas and so affords the benefit specified. Among such other substances I mention sodium benzoate, sugar, and compositions of urea such as urea aldehyde.

The clay that carries the corrective addition that has been described is used in customary manner in the preparation of the slip in enamel-ware making, and the slip is applied to the surface that is to be enameled. From it a ground coat may be developed in usual manner that is free of the fault of fish-scaling. Upon this ground coat a cover coat may be spread and fired in conventional manner.

I claim as my invention:

1. In enamel-ware making, a slip compounded of frit together with a clay that carries an addition of a substance that, stable within the temperature range that is realized in drying, at the firing temperature of the ware gives off gas.

2. In enamel-ware making, a slip compounded of frit together with a clay that carries an addition of a substance that, stable within the temperature range that is realized in drying, at the firing temperature of the ware gives off gas, such addition being selected from a group that consists of urea and sodium bicarbonate.

3. In enamel-ware making, a slip compounded of frit together with a clay that carries an addition of substantially 4% of urea.

4. In enamel-ware making, a slip compounded of frit together with a clay that carries an addition of urea, together with an inhibitor of bacterial growth.

5. In enamel-ware making, a slip compounded of frit together with a clay that carries an addition of substantially 4% of urea, together with approximately 0.20% of copper carbonate.

6. In enamel-ware making, a slip compounded of frit together with a clay that carries an addition of sodium bicarbonate.

7. The refinement herein described of the procedure of producing enamel ware by first drying and then firing upon a metal surface a coating of a slip compounded of frit and clay, which consists in preparing the clay by addition thereto of a substance that, stable within the temperature range that is realized in drying, at the firing temperatures gives off gas.

8. The refinement herein described of the procedure of producing enamel ware by first drying and then firing upon a metal surface a coating of a slip compounded of frit and clay, which consists in preparing the clay by addition thereto of urea in quantity of substantially 4% as a minimum.

JACOB E. ROSENBERG.